United States Patent
Izawa (10) Patent No.: US 11,412,093 B2
(45) Date of Patent: Aug. 9, 2022

(54) IMAGE PROCESSING SYSTEM, DEVICE, AND PRODUCT FORMS REFERENCE IMAGES ON A SHEET BY FIRST AND SECOND IMAGING FORMING DEVICES AND DETERMINES IMAGE POSITIONAL DEVIATION

(71) Applicant: Konica Minolta, Inc., Tokyo (JP)

(72) Inventor: Tomomi Izawa, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 17/404,437

(22) Filed: Aug. 17, 2021

(65) Prior Publication Data
US 2022/0070305 A1     Mar. 3, 2022

(30) Foreign Application Priority Data
Aug. 25, 2020   (JP) .............................. JP2020-142013

(51) Int. Cl.
*H04N 1/00*     (2006.01)
*H04N 1/60*     (2006.01)

(52) U.S. Cl.
CPC ..... *H04N 1/00015* (2013.01); *H04N 1/00031* (2013.01); *H04N 1/00037* (2013.01); *H04N 1/00045* (2013.01); *H04N 1/00068* (2013.01); *H04N 1/00074* (2013.01); *H04N 1/00087* (2013.01); *H04N 1/6055* (2013.01)

(58) Field of Classification Search
CPC ........... H04N 1/00015; H04N 1/00031; H04N 1/00034; H04N 1/00037; H04N 1/00042; H04N 1/00045; H04N 1/00068; H04N 1/00071; H04N 1/00074; H04N 1/00076; H04N 1/00087; H04N 1/6033; H04N 1/6052; H04N 1/6055; G06K 15/027
See application file for complete search history.

(56) References Cited

U.S. PATENT DOCUMENTS

| | | | |
|---|---|---|---|
| 10,178,279 B2 * | 1/2019 | Tsuji ................. | H04N 1/00795 |
| 10,554,861 B2 * | 2/2020 | Jung ................... | H04N 1/6036 |
| 2016/0286081 A1 * | 9/2016 | Kimura ............. | G03G 15/5058 |
| 2018/0173478 A1 * | 6/2018 | Hayakawa ........... | G06K 15/027 |
| 2020/0195798 A1 * | 6/2020 | Izawa ................ | H04N 1/00037 |

FOREIGN PATENT DOCUMENTS

JP     2018199223 A    12/2018

* cited by examiner

*Primary Examiner* — Scott A Rogers
(74) *Attorney, Agent, or Firm* — Cantor Colburn LLP (57) ABSTRACT

Provided is an image forming system including a first image forming device, a second image forming device; and an image reading device. A first hardware processor of the first image forming device causes a first image former of the first image forming device to form a first reference image on a first face of a sheet. A second hardware processor of the second image forming device causes a second image former of the second image forming device to form a second reference image different from the first reference image on the first face of the sheet. A third hardware processor of the image reading device determines whether an image positional deviation is present based on the first reference image and the second reference image that are formed on the first face of the sheet and that are read by the image reading device.

12 Claims, 7 Drawing Sheets

IMAGE PROCESSING SYSTEM, DEVICE, AND PRODUCT FORMS REFERENCE IMAGES ON A SHEET BY FIRST AND SECOND IMAGING FORMING DEVICES AND DETERMINES IMAGE POSITIONAL DEVIATION

CROSS-REFERENCE TO RELATED APPLICATIONS

The present invention claims priority under 35 U.S.C. § 119 to Japanese Patent Application No. 2020-142013 filed on Aug. 25, 2020, the entire content of which is incorporated herein by reference.

BACKGROUND

Technological Field

The present invention relates to an image forming system, an image processing apparatus, and a recording medium.

Description of the Related Art

Conventionally, there has been known an image forming system including two image forming devices connected in series (ex. JP 2018-199223 A). Such an image forming system, in which a printing process is shared by two image forming devices, can improve the productivity and suppress the printing cost per sheet compared to a system with one image forming device.

SUMMARY

However, in such an image forming system, when images are formed on the same surface of a sheet by two devices, one image formed by the first image forming device and another by the second image forming device are sometimes misaligned, which has been troublesome because it could be checked only visually.

The present invention has been conceived in view of such circumstances, and has an object of providing an image forming system, an image processing apparatus, and a recording medium that facilitate check of misalignment of images formed on one surface by two image forming devices.

To achieve at least one of the abovementioned objects, an image forming system reflecting one aspect of the present invention includes:
  a first image forming device,
  a second image forming device that is connected in series on a downstream side with respect to the first image forming device; and
  an image reading device that is connected on a downstream side with respect to the first image forming device and the second forming device,
  wherein the first image forming device includes a first hardware processor,
  wherein the second image forming device includes a second hardware processor,
  wherein the image reading device includes a third hardware processor,
  wherein the first hardware processor causes a first image former of the first image forming device to form a first reference image on a first face of a sheet;
  wherein the second hardware processor causes a second image former of the second image forming device to form a second reference image different from the first reference image on the first face of the sheet on which the first reference image is formed;
  wherein the third hardware processor determines whether an image positional deviation is present based on the first reference image and the second reference image that are formed on the first face of the sheet respectively by the first image former of the first image forming device and the second image former of the second image forming device and that are read by the image reading device.

To achieve at least one of the abovementioned objects, an image processing apparatus reflecting another aspect of the present invention includes:
  a first image forming device,
  a second image forming device that is connected in series on a downstream side with respect to the first image forming device; and
  an image reading device that is connected on a downstream side with respect to the first image forming device and the second forming device,
  wherein the first image forming device includes a first hardware processor,
  wherein the second image forming device includes a second hardware processor,
  wherein the image reading device includes a third hardware processor,
  wherein the first hardware processor causes a first image former of the first image forming device to form a first reference image on a first face of a sheet;
  wherein the second hardware processor causes a second image former of the second image forming device to form a second reference image different from the first reference image on the first face of the sheet on which the first reference image is formed;
  wherein the third hardware processor determines whether an image positional deviation is present based on the first reference image and the second reference image that are formed on the first face of the sheet respectively by the first image former of the first image forming device and the second image former of the second image forming device and that are read by the image reading device.

To achieve at least one of the abovementioned objects, a non-transitory computer-readable storage medium reflecting another aspect of the present invention stores a program for an image forming system,
  wherein the image forming system includes:
  a first image forming device,
  a second image forming device that is connected in series on a downstream side with respect to the first image forming device; and
  an image reading device that is connected on a downstream side with respect to the first image forming device and the second forming device,
  wherein the program causes a computer provided in the image forming system to:
    cause a first image former of the first image forming device to form a first reference image on a first face of a sheet;
    cause a second image former of the second image forming device to form a second reference image different from the first reference image on the first face of the sheet on which the first reference image is formed; and
    determine whether an image positional deviation is present based on the first reference image and the second reference image that are formed on the first face of the sheet respectively by the first image former of the first image forming device and the second image former of the second image forming device and that are read by the image reading device.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein.

DETAILED DESCRIPTION OF THE EMBODIMENTS

An image forming system in an embodiment is described in detail with reference to the drawings. The image forming system in this embodiment is merely an example, and the present invention is not necessarily limited to this example.

[Overall Configuration of Image Forming System]

An overall configuration of an image forming system 10 is described with reference to FIG. 1 to FIG. 3.

Figure 1:
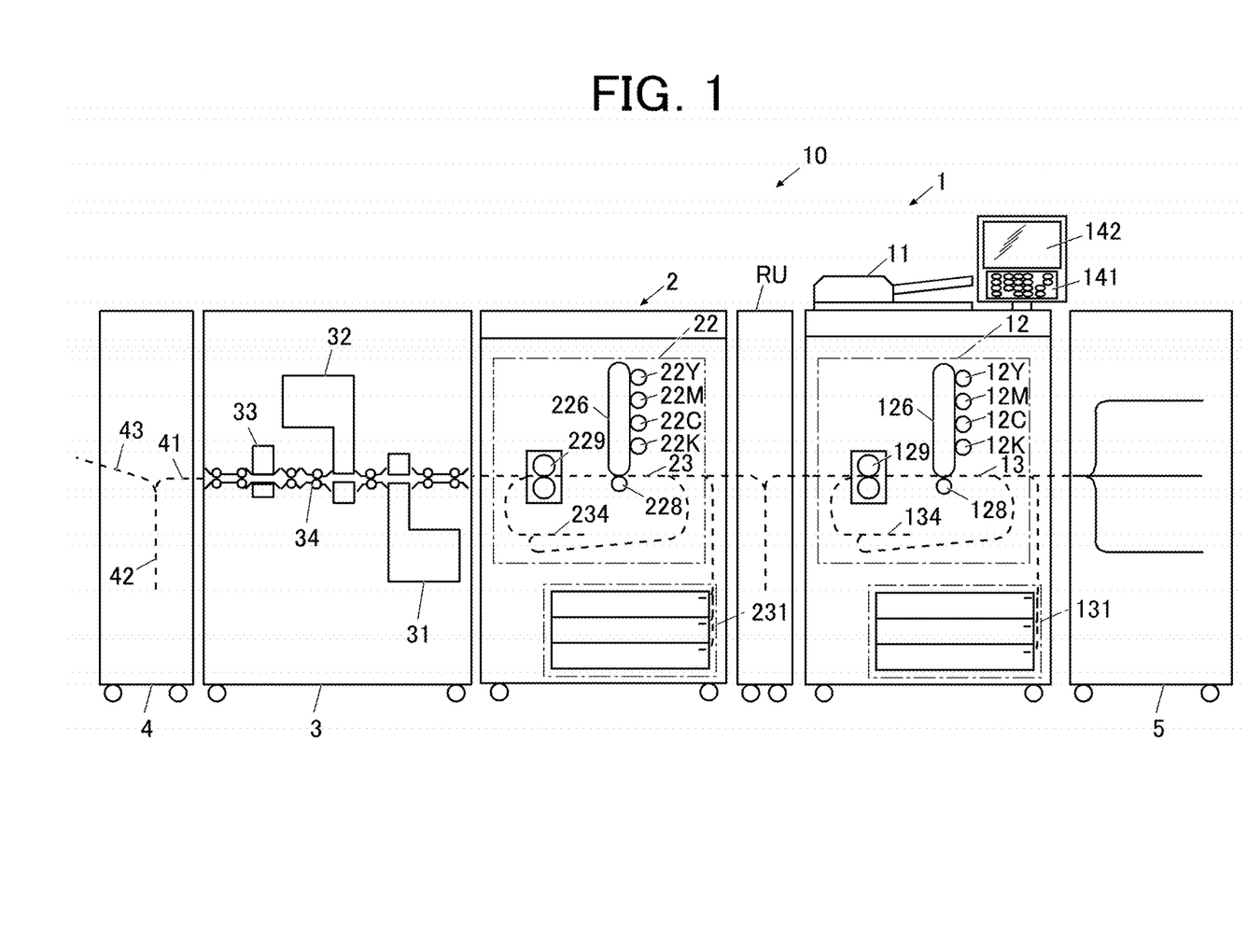
FIG. 1 is a schematic diagram showing an overall configuration of an image forming system in an embodiment.
Figure 2:
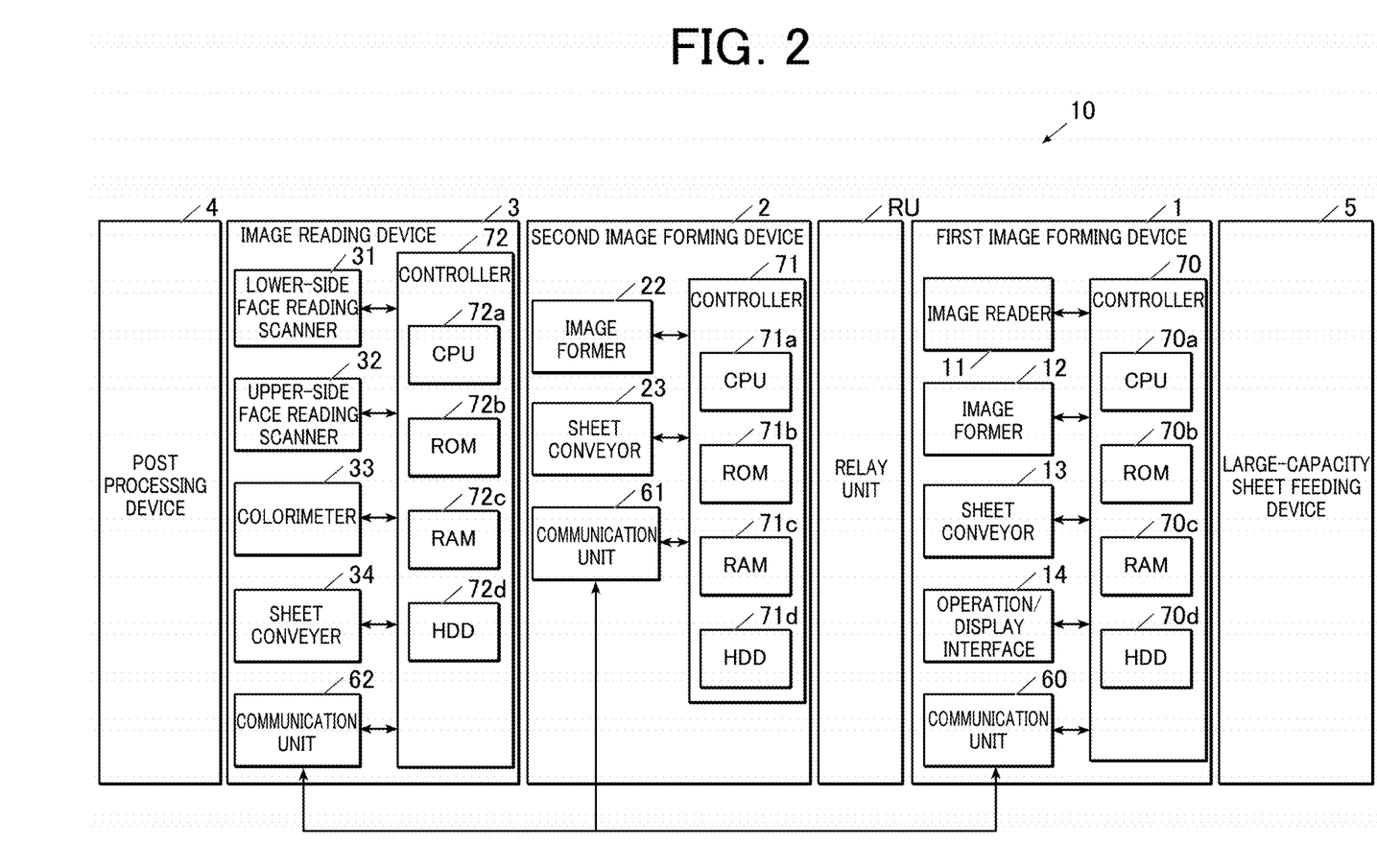
FIG. 2 is a block diagram showing an exemplary configuration of each device of the image forming system in the embodiment.

The image forming system 10 includes, as shown in FIG. 1 and FIG. 2, a large-capacity sheet feeding device 5, a first image forming device 1, a relay unit RU, a second image forming device 2, an image reading device 3, and a post processing device 4, in order of downstream direction of the image conveyance path.

The image forming system 10 is connected for information transmission and reception via communication units of the first image forming device 1, the relay unit RU, the second image forming device 2, the image reading device 3, the post processing device 4, and the large-capacity sheet feeding device 5.

(Large-Capacity Sheet Feeding Device)

The large-capacity sheet feeding device 5, which includes sheet feeders (not shown in the drawings) and a sheet conveyer (not shown in the drawings), conveys a sheet P from one of the sheet feeders to the first image forming device. The sheet conveyer is connected from each of the sheet feeders to the first image forming device 1 to convey the sheet P. The sheet feeders stores various types of sheets P.

The large-capacity sheet feeding device 5 is not necessarily provided depending on the printing amount or the sheet types, and the sheet P may be conveyed from a sheet feeding device 131 of the first image forming device 1 only.

(First Sheet Feeding Device)

An example of the first sheet feeding device 1 is an electrophotographic image forming device such as a copying machine. The first image forming device 1 in FIG. 1 to FIG. 3 is called a tandem-type color image forming device in which multiple photoreceptors facing an intermediate transfer belt are arranged in the vertical direction to allow a full-color image to be formed on the intermediate transfer belt.

Figure 3:
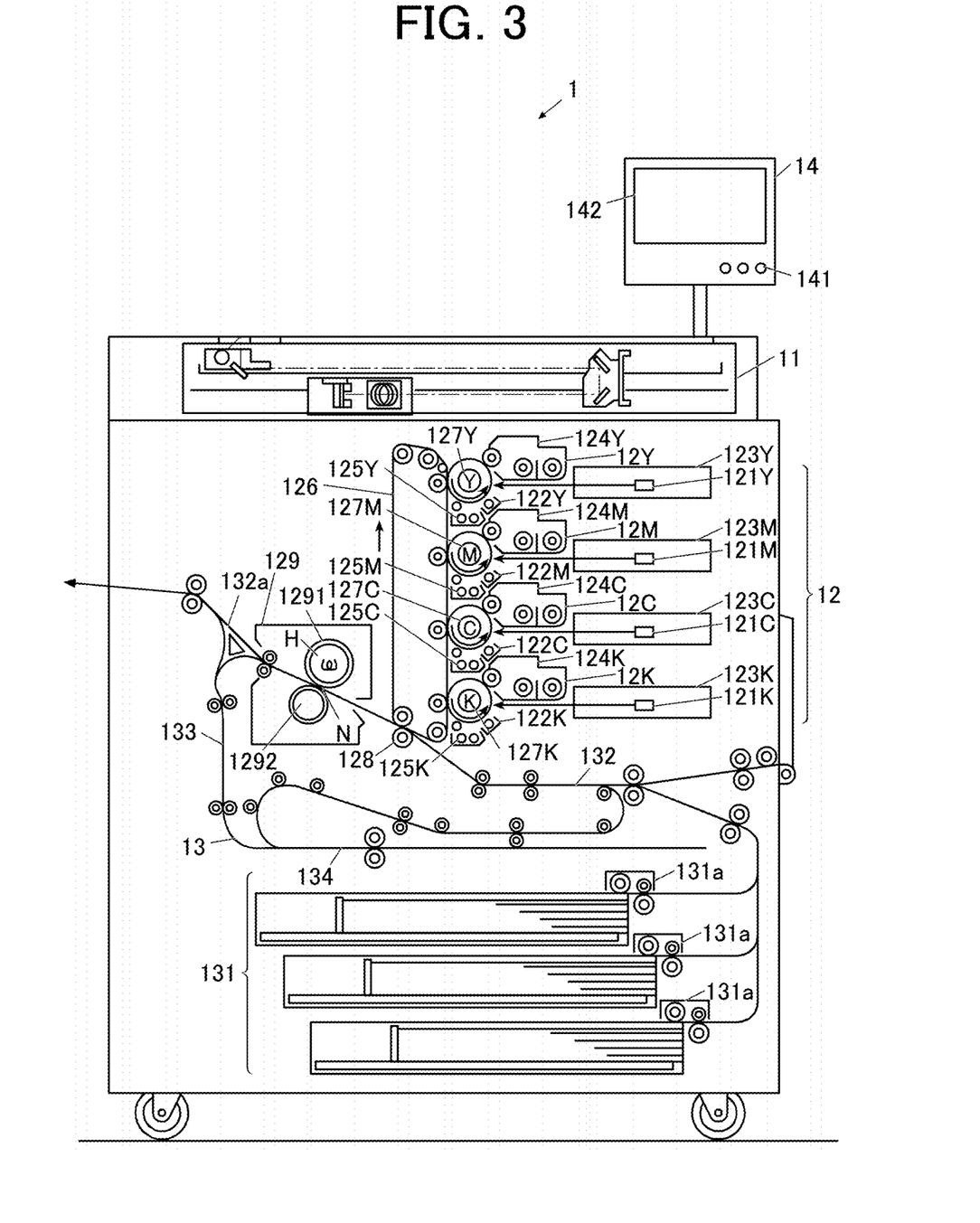
FIG. 3 is a schematic diagram showing an exemplary configuration of an image forming device in the embodiment.

The first image forming device 1 includes, as shown in FIG. 1 to FIG. 3, an image reader 11, an image former 12, a sheet conveyer 13, an operation/display interface 14, a communication unit 60, and a controller (first hardware processor) 70, for example. The components of the first image forming device 1 are connected with each other via a bus.

<Image Reader>

The image reader 11, which includes an automatic document conveyer (auto document feeder; ADF), a platen glass, and an optical system, obtains image data by reading a document placed on the ADF or the platen glass with the optical system.

The first image forming device 1 may obtain image data from a separate personal computer (PC) terminal or the like by network communication instead of obtaining it from the image reader 11.

<Image Former>

The image former 12 forms an image on a sheet P based on the obtained image data. The image former 12 includes, for example, an image forming section 12C that forms an image of cyan (C), an image forming section 12M that forms an image of magenta (M), an image forming section that forms an image of yellow (Y), and an image forming section 12K that forms an image of black (K), but is not limited to this example. The image former 12 may include only one image forming section 12C or 12K, for example.

The image forming section 12C includes a photosensitive drum C, a charger 122C arranged around the photosensitive drum C, an optical writing unit 123C with a laser diode 121C, a developing unit 124C, and a drum cleaner 125C.

The photosensitive drum C is uniformly charged on its surface by the charger 122C, and a latent image is formed on it by scanning exposure from the laser diode 121C of the optical writing unit 123C. The developing unit 124C visualizes the latent image on the photosensitive drum C by developing with toner. In this way, an image of cyan is formed on the photosensitive drum C.

The configurations of the image forming sections 12M, 12Y, and 12K and the photosensitive drums M, Y, K are substantially the same as the configuration of the image forming section 12C and the photosensitive drum C, and are not described in detail.

The images formed on the photosensitive drums C, M, Y, and K are primarily transferred at predetermined positions on the intermediate transfer belt 126, a belt-shaped intermediate transfer body, by the primary transfer rollers 127C, 127M, 127Y, and 127K. The images of colors transferred onto the intermediate transfer belt 126 are secondarily transferred by the secondary transfer unit 128 onto the sheet P conveyed by the sheet conveyer 13 at predetermined timings.

The sheet P onto which the secondary transfer unit 128 secondarily transfers the image is conveyed to the fixer 129. The fixer 129 is arranged downstream of the intermediate transfer belt 126, and includes a fixing roller 1291 and a pressure roller 1292 that fix the toner image formed by the image former 12 on the sheet P. The fixer 129 performs fixing processing that fixes the toner image with the set of the fixing roller 1291 and the pressure roller 1292 that are pressed against each other, while conveying the sheet P. The fixing roller 1291 and the pressure roller 1292 are both used as a fixing member, and a heater H is arranged inside the fixing roller 1291. The heater H heats the surface of the fixing roller 1291 to transfer heat to the sheet P passing through a fixing nip N between the fixing roller 1291 and the pressure roller 1292. The heated fixing roller 1291 rotates around an axis of the fixing roller 1291 to transfer heat to the sheet P passing through the fixing nip P. As the sheet P is heated, the toner image on the sheet P is melted and fixed on the sheet P.

<Sheet Conveyer>

The sheet conveyer 13 includes multiple sheet feeders 131 that store sheets P, a sheet feeding unit 131*a* that feeds out the sheets P stored in the sheet feeders 131*a*. The sheet conveyer 13 includes a main conveyance path 132 along which the sheet P supplied from the sheet feeding device 131 is conveyed and a flip conveyance path 133 that is branched from the main conveyance path 132 downstream of the fixing unit 129 and that turns the sheet P upside down. The sheet P conveyed along the main conveyance path 132 is ejected to the relay unit RU connected to the sheet ejector of the first image forming device 1.

The sheet conveyer 13 includes a switching gate 132*a* arranged at a branching point of the main conveyance path 132 and the flip conveyance path 133. An image is formed on a surface facing upward (first face) of the sheet P that has been conveyed through the main conveyance path 132 in the first image forming device 1 and has passed through the secondary transfer unit 128 and the fixer 129. When an image is formed on the both sides of the sheet P, the sheet P is conveyed from the main conveyance path 132 to the flip conveyance path 133 after an image is formed on the first face. The sheet P is flipped upside down on the sheet flip conveyance path 134 of the flip conveyance path 133 so that the second face of the sheet P faces upward. Thereafter, the sheet P is conveyed to the main conveyance path 132. An image can thereby formed on the second face of the sheet P turned upside down.

When the first image forming device 1 performs single-sided printing only, the flip conveyance path 133 and the sheet flip conveyance path 134 are not used.

<Operation/Display Interface>

The operation/display interface 14 includes, for example, an operation unit 141 and a display unit 142. The operation unit 141 includes multiple operation buttons and receives user operations. The display unit 142 includes a liquid crystal display (LCD) or an organic EL display. A pressure-sensitive touch panel with transparent electrodes in a grid pattern is provided on the display. The display unit 142 presents various screens such as a guidance screen and messages concerning job execution to the users, and displays images of operation buttons for touch operation to receive touch operations by the users.

<Communication Unit>

The communication unit 60 is an interface connected to an external local area network (LAN) or the like, which includes a network interface card (NIC), a modem, and the like, for example. The communication unit 60 establishes a connection with a PC terminal or a printing controller not shown in the drawings, and executes transmission and reception of various kinds of data. The communication unit 60 is also an interface for establishing communication with other devices, and transmits and receives various kinds of data. For example, the communication unit 60 receives reading results (read data) from the communication unit 62 of the image reading device 3. The communication unit 60 transmits and receives various kinds of information such as information necessary for control of various setting values and operations, information on detection of sheets P, and occurrence of jams, to and from the second image forming device 2, the image reading device 3, the post processing device 4, and the large-capacity sheet feeding device 5.

<Controller>

A hardware configuration of the controller 70 is described.

The controller 70 is a function realized by a hardware source used as a computer. A shown in FIG. 2, the controller 70 includes a central processing unit (CPU) 70*a*, a read only memory (ROM) 70*b*, a random access memory (RAM) 70*c*, and a hard disk drive (HDD) 70*d*. The components of the controller 70 are connected via a bus not shown in the drawings.

The CPU 70*a* reads program codes of a software for executing functions of the embodiments of the present invention from the ROM 70*b* to execute them.

The ROM 70*b*, which is used as an example of a non-volatile memory, stores a program(s), data, and the like necessary for operation of the CPU 70*a*.

The RAM 70*c*, which is used as an example of a volatile memory, stores variables, parameters, and the like appeared in arithmetic processing necessary for processes executed by the CPU 70*a*.

The HDD 70*d*, which is used as an example of a non-volatile storage, stores programs and data such as a program(s) for the CPU 70*a* controlling the operations, an operating system (OS), a control unit, and the like. Part of the programs and data stored in the HDD 70*d* may be stored in the ROM 70*b*. The ROM 70*b* and the HDD 70*d* are used as an example of a non-transitory computer-readable storage medium that stores programs executed by the CPU 70*a*. The non-transitory computer-readable storage medium storing programs executed by the controller 70 is not limited to the ROM 70*b* and the HDD 70*d*, and may be, for example, a solid state drive (SSD), a CD-ROM, a DVD-ROM, or the like.

The controller 70 functions as a first controlling means that causes the image former 12 to form an image on the sheet P based on the image data obtained from the image reader 11, a separate personal computer terminal, or the like.

The controller 70 functions as a correcting means to perform image forming position correction processing based on positional deviation information received from the image reading device 3.

(Relay Unit)

The relay unit RU, which is positioned between the first image forming device 1 and the second image forming device 2, flips the sheet P supplied from the first image forming device 1 with a switching gate, as necessary, to send the sheet P to the second image forming device, in a case where double-side printing is performed by those two devices, for example. In a case where the sheet ejector of the first image forming device 1 and the sheet obtainer of the second image forming device 2 are of the same height, the relay unit RU plays a function as a bridge between the two devices.

(Second Image Forming Device)

The second image forming device 2, which includes an image former 22, a sheet conveyer 23, a communication unit 61, and a controller (second hardware processor) 71, forms an image on the sheet P sent from the relay unit RU and then conveys the sheet P to the image reading device 3.

The image former 22 of the second image forming device 2 is preferably configured to perform printing differently from the first image forming device 1 for a more efficient printing process. Specifically, for example, in the case where the first image forming device 1 includes the image forming sections 12C, 12M, 12Y, and 12K that respectively forms images of cyan, magenta, yellow, and black, the second image forming device 2 includes image forming sections 22LC, 22LM, 22LY, and 22G (not shown in the drawings) that respectively form images of light cyan (LC), light magenta (LM), light yellow (LY), green (G) which are lighter than cyan, magenta, yellow, and black. Alternatively, in a case where the image forming section 12K of the first image forming device 1 performs printing with a regular black toner, the image forming section 22K of the second image forming device 2 performs printing with a black magnetic toner capable of magnetic ink character recognition.

The controller 71 functions as a second controlling means that causes the image former 22 to form an image on an image based on image data obtained from the image reader 11 or a separate personal computer terminal.

The controller 71 functions as a correcting means to perform image forming position correction processing based on positional deviation information received from the image reading device 3.

The configuration of the sheet conveyer 23 and the communication unit 61 excluding the image former 22 and the controller 71, which is substantially the same as that of the sheet conveyer 13 and the communication unit 60 of the first image forming device 1, is not described in detail.

(Image Reading Device)

The image reading device 3 includes a lower-side surface reading scanner 31, an upper-side surface reading scanner 32, a colorimeter 33, a sheet conveyer 34, a communication unit 62, and a controller (third hardware processor) 72. The lower-side surface reading scanner 31, the upper-side surface 32, and the colorimeter 33 are arranged in order of conveyance of a sheet P in the vicinity of the sheet conveyer 34. For example, the lower-side surface reading scanner 31 and the upper-side surface reading scanner 32 each includes a line sensor such as a charge-coupled device (CCD) sensor, and the colorimeter 33 includes an spectral colorimeter.

The components of the image reading device 3 are connected with each other via a bus. The controller 72 includes a CPU 72a, a ROM 72b, a RAM 72c, and an HDD 72d.

The upper-side surface reading scanner 32 and the colorimeter 33 can read the image printed on the upper side of the sheet P, and the lower-side surface reading scanner 31 can read the image printed on the lower side of the sheet P.

As described later, in the image forming position correction processing, the controller 72 functions as a generating means to generate positional deviation information based on the reading data of the image formed on the sheet P obtained by the upper-side surface reading scanner 32 and the lower-side surface reading scanner 31 and a determining means that determines whether an image positional deviation is present based on the positional deviation information.

The sheet conveyer 34 conveys the sheet P sent from the second image forming device 2 to the post processing device 4 through the lower-side surface reading scanner 31, the upper-side surface reading scanner 32, and the colorimeter 33.

(Post Processing Device)

The post processing device 4, which includes a sheet conveyer 41, a switching gate 42, a sheet ejector 43, and a folding unit or a stapling unit not shown in the drawings, performs post processing such as folding and stapling on the sheet P sent from the image reading device 3.

The sheet conveyer 41 ejects the sheet P as a printed matter on which post processing is performed from the image reading device 3 to the sheet ejector 43 via the switching gate 42 as necessary.

[Steps of Image Forming Position Correction Processing]
(Single-Sided Printing)

Figure 4:
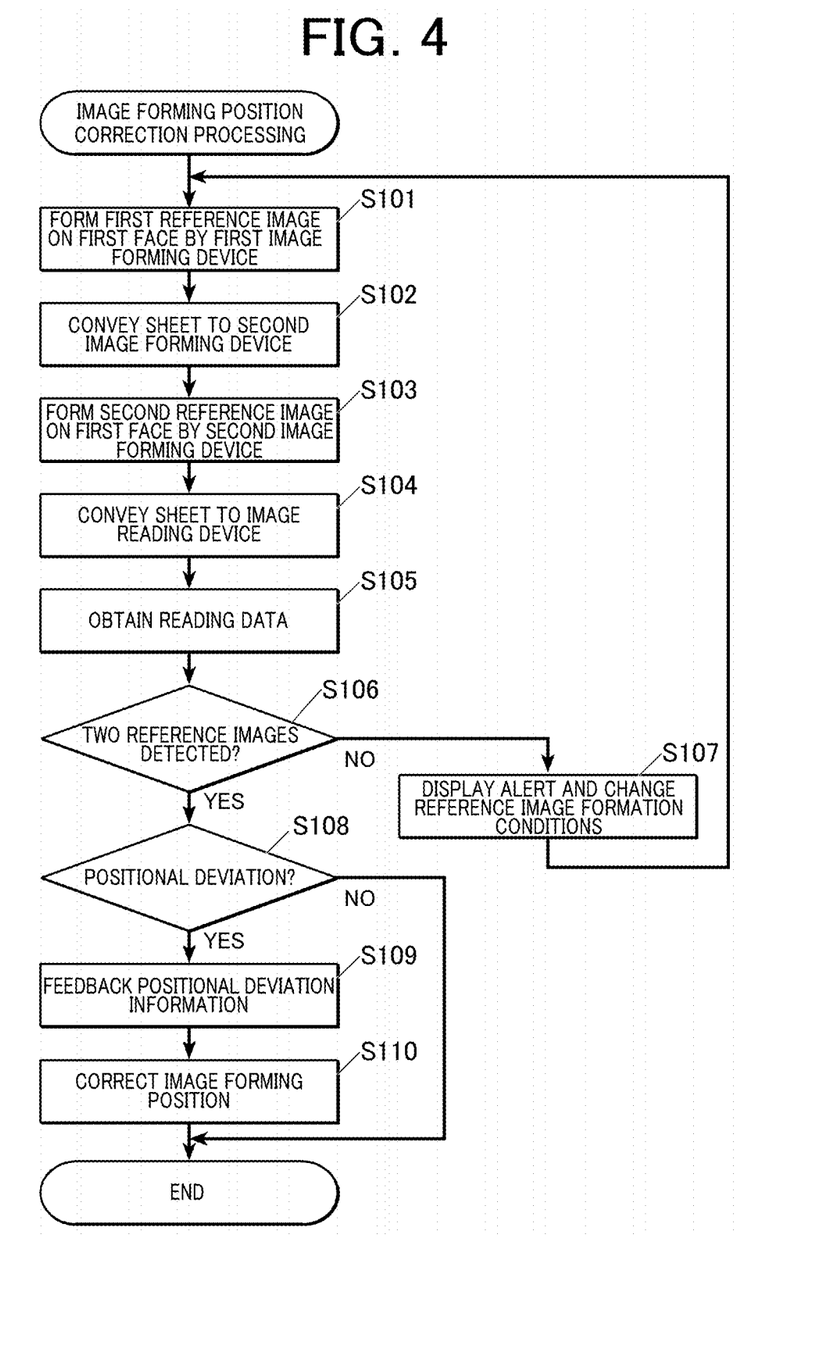
FIG. 4 is a flowchart showing an example of an image forming position correction processing in a single-sided printing in this embodiment.

Described are the steps of the image forming position correction processing when the first image forming device 1 and the second image forming device 2 perform printing of the first face of the sheet P only in the image forming system 10, with reference to the flowchart shown in FIG. 4.

First, the controller 70 of the first image forming device 1 causes the image former 12 to form a first reference image K1 for correcting the image forming position on the first side of the sheet P conveyed from the sheet feeding device 131 or the large-capacity sheet feeding device 5 (Step S101).

Figure 5:
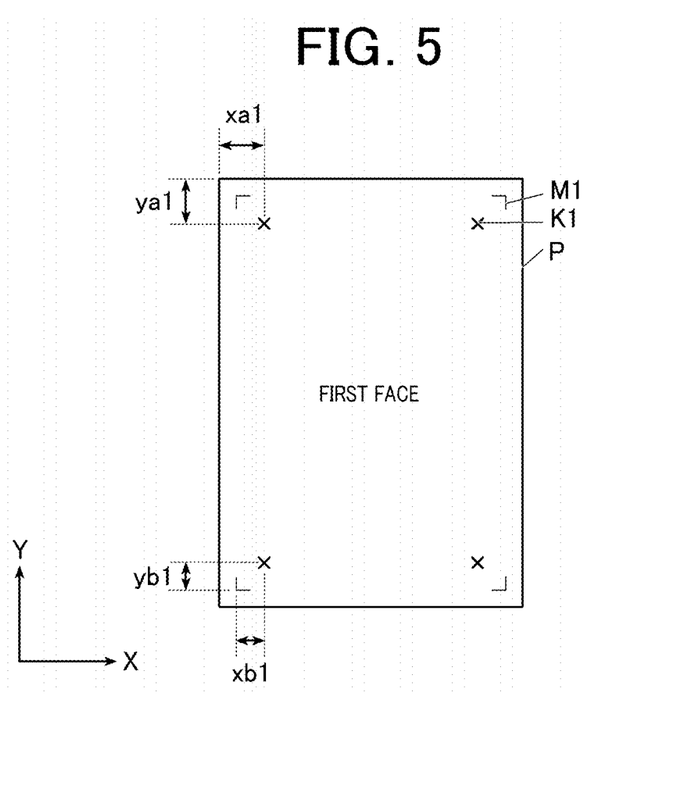
FIG. 5 is an example of a first reference image and a second reference image formed on a first face of a sheet in this embodiment.

In this embodiment, the first reference image K for printing position measurement is a cross-shaped mark called a crop mark or a registration mark and formed at each of four corners of the sheet P, as shown in FIG. 5.

The image former 12 forms the first reference image K1 at a position positioned at distances of xa0 in the scanning direction x and ya0 in the vertical direction y (vertical to the scanning direction) from a reference position of the edge of the sheet P, based on the command from the controller 70.

Hereinafter, the distances from the forming position of the reference image to the edge of the sheet P are referred to as setting distances such as xa0 and ya0 in the command of the controller 70 to the image former 12.

Next, the sheet conveyer 13 and the relay unit RU convey, to the second image forming device 2, the sheet P with its first face facing upward without flipping (Step S102).

The controller 71 of the second image forming device 2 causes the image former 22 to form the second reference image M1 on the first side of the sheet P (Step S103).

At this time, the controller 71 causes the image former 22 to form the second reference image M1 different from the first reference image K1. The second reference image M1 is different from the first reference image K1 in the image forming position or the shape. As shown in FIG. 5, the first reference image K1 and the second reference image M1 are different from each other in the image forming position and the shape in this embodiment.

As the second reference image M1 is formed differently from the first reference image K1 in the image forming position or the shape, the image reading device 3 can easily detect the both reference images, making it easier to determine whether the image positional deviation is present.

In addition, when the second reference image M1 is formed differently from the first reference image K1 in the image forming position or the shape, the second reference image M1 is formed in different colors from the first reference image K1. This makes it easier for the image reading device 3 to determine whether the image positional deviation is present.

Next, the sheet conveyer 23 conveys, to the image reading device 3, the sheet P with its first face facing upward without flipping (Step S104).

The controller 72 of the image reading device 3 causes the sheet conveyer 34 to convey the sheet P got from the second image forming device 2 and pass the sheet P through the lower-side face reading scanner 31, the upper-side face reading scanner 32 and the colorimeter 33 so as to read the first reference image K1 and the second reference image M1 formed on the first side of the sheet P and thereby obtains the reading data (Step S105).

The controller 72 determines whether the first reference image K1 and the second reference image M1 are detected in the reading data (Step S106).

If the controller 72 determines that only one reference image is detected at Step S106 (Step S106; No), the controller 72 outputs an alert of an image error to the display 142 (notifier) of the operation/display interface 14 as an alerting means, and commands change of image forming conditions of at least one of the first reference image K1 and the second reference image M1 to the controller 70 or the controller 71 (Step S107). Thereafter, back to Step S101, the controller 70 causes the image former 12 to form the reference image K1 on a new sheet P.

If the controller 72 determines that the first reference image K1 and the second reference image M1 are detected (Step S106; Yes), the controller 72 generates positional deviation information and determines whether a positional deviation is present (Step S108).

The method of determining whether an image positional deviation is present. For example, in determining whether an image positional deviation is present regarding the first reference image K1, the controller 72 calculates differences between the distance xa1 from the edge of the sheet P to the reference image K1 actually measured by the reading data and the setting distance xa0 and between the actual distance ya1 and the setting distance ya0, and determines whether a positional deviation is present from the differences are within a determination reference value. The difference (xa0−xa1) is a positional deviation amount in the scanning direction and the difference (ya0−ya1) is a positional deviation amount in the vertical direction.

Similarly, it is possible to determine whether an image positional deviation is present regarding the second reference image M1 by whether the differences between the distance xb1 from the first reference image K1 to the second reference image M1 actually formed and the setting distance xb0 between the actual distance yb1 and the setting distance yb0 are within a predetermined determination reference value. The difference (xb0−xb1) is a positional deviation amount in the scanning direction and the difference (yb0−yb1) is a positional deviation amount in the vertical direction.

Though the determination reference value is set in the controller 72, the user may modify it to a desired value via the operation/display interface 14.

If the controller 72 determines that no image positional deviation is present regarding the first reference image K1 and the second reference image M1 (Step S108; No), the controller 72 ends the image forming position correction processing.

If the controller 72 determines that an image positional deviation is present regarding at least one of the first reference image K1 and the second reference image M1 (Step S108; Yes), the controller 72 feeds back the positional deviation information to the image forming device 1 and/or the image forming device 2 corresponding to the positional deviation (Step S109). The controller 70 and/or the controller 71 thereby correct the image forming conditions so as to form the image at the correct printing position in the subsequent printing processes based on the positional deviation information fed back and correct the image forming position (Step S110). Specifically, in the case where the controller 70 corrects the image forming position, for example, the image forming conditions of the image former 12 are corrected so that the distances between the edge of the sheet P and the first reference image K1 matches the setting distances x0 and y0.

(Double-Sided Printing)

Figure 6:
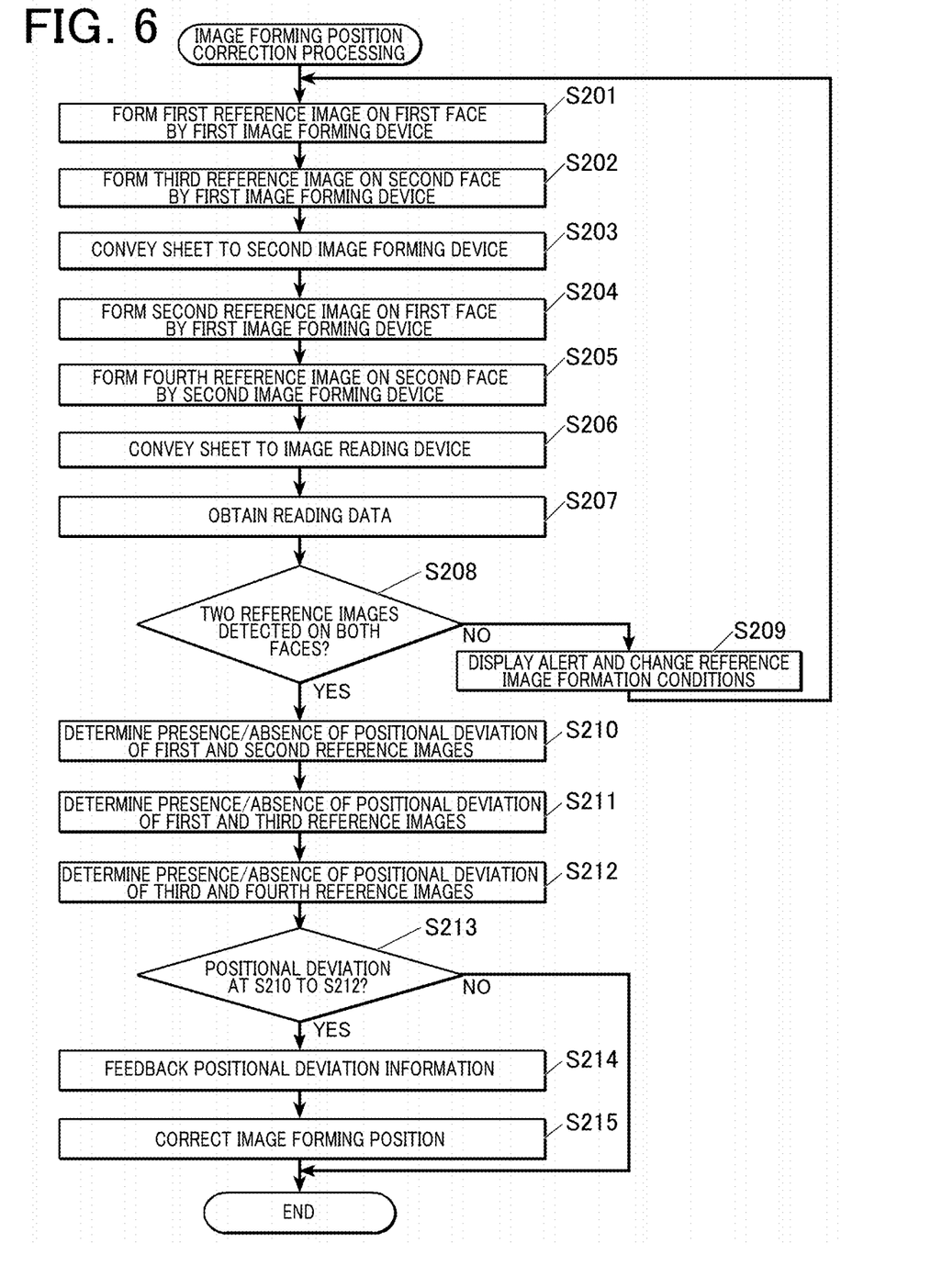
FIG. 6 is a flowchart showing an example of an image forming position correction processing in a double-sided printing in this embodiment.

Next described are the steps of the image forming position correction processing when the switching gate 132a of the first image forming device 1, the switching gate (not show in the drawings) of the second image forming device 2, and the switching gate of the relay unit RU with reference to the flowchart shown in FIG. 6.

In the following, description of the steps overlapping with Steps 101 to S110 is simplified or omitted.

First, the controller 70 of the first image forming device 1 causes the image former 12 to form the first reference image K1 on the first side of the sheet P similarly to Step S101 (Step S201).

Next, the controller 70 causes the sheet P to be conveyed from the main conveyance path 132 to the flip conveyance path 133 with the switching gate 132a, flipped upside down, and conveyed, to the main conveyance path 132, with the second side of the sheet P facing upward.

The controller 70 causes the image former 12 to form the third reference image K2 on the second face of the sheet P conveyed from the flip conveyance path 133 (Step S202).

Figure 7:
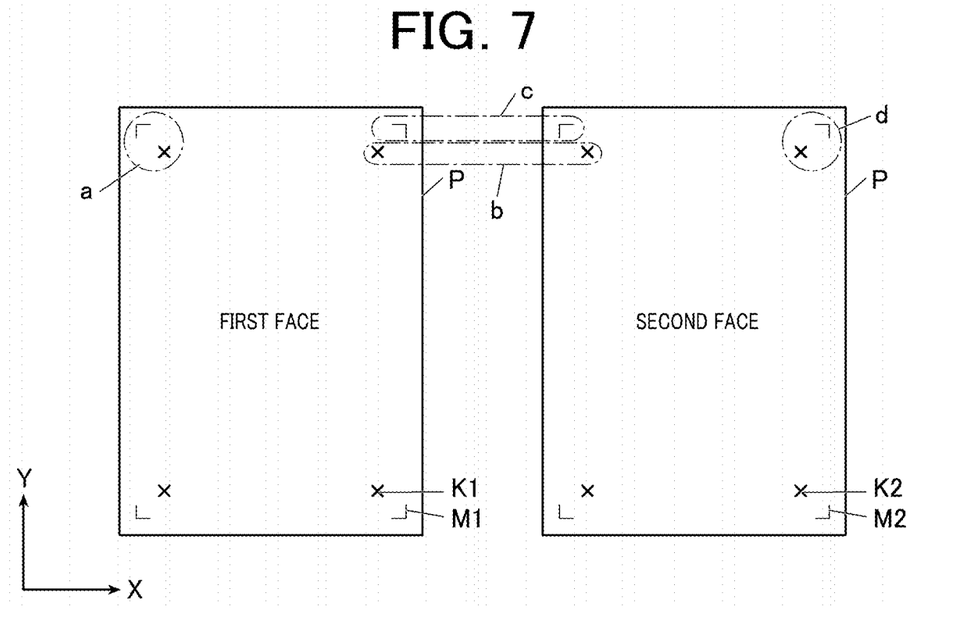
FIG. 7 is an example of the first reference image and the second reference image formed on the first face of a sheet and a third reference image and a fourth reference image formed on a second face of the sheet in this embodiment.

In this embodiment, as shown in FIG. 7, the shapes are substantially the same between the first reference image K1 and the third reference image K2 and between the second reference image M1 and the fourth reference image M2, but the present invention is not limited to this example.

Next, the relay unit RU flips the sheet P sent from the sheet conveyer 13 and conveys, to the second image forming device 2, the sheet P with its first face facing upward (Step S203).

The controller 71 of the second image forming device 2 causes the image former 22 to form the second reference image M1 on the first side of the sheet P and the fourth reference image M2 on the second side, similarly to Steps 201 and S202 (Step S204, S205).

The sheet conveyer 23 flips the sheet P and conveys, to the image reading device 3, the sheet P with its first face facing upward (Step S206).

Next, the controller 72 of the image reading device 3 causes the sheet conveyer 34 to convey the sheet P got from the second image forming device 2 and pass the sheet P through the lower-side face reading scanner 31, the upper-side face reading scanner 32, and the colorimeter 33 so as to read the first reference image K1 and the second reference image M1 formed on the first side of the sheet P and the third reference image K2 and the fourth reference image M2 formed on the second side of the sheet P and thereby obtains the reading data of the first face and the second face (Step S207).

The controller 72 determines whether the first reference image K1 and the second reference image M1 are detected in the reading data of the first face and whether the third reference image K2 and the fourth reference image M2 are detected from the reading data of the second face (Step S208).

If the controller 72 determines that only one reference image is detected in the reading data regarding at least one of the first face or the second face (Step S208; No), the controller 72 outputs an alert of an image error to the display 142 and commands change of image forming conditions to the controller 70 and/or the controller 71 (Step S209).

Thereafter, back to Step S201, the controller 70 causes the image former 12 to form the first reference image K1 on a new sheet P.

If the controller 72 determines that the two reference images are detected in the reading data regarding both faces (Step S208; Yes), the controller 72 generates positional deviation information concerning misalignment of the first reference image K1 and the second reference image M1 as shown in FIG. 7 as "a" and determines whether a positional deviation is present, similarly to Step S108 (Step S210).

Next, the controller 72 generates positional deviation information concerning the image positional deviation regarding the first reference image K1 and the third reference image K2 as shown in FIG. 7 as "b" and determines whether a positional deviation is present. Specifically, the controller 72 calculates differences between the distances from the first reference image K1 to the third reference image K2 actually formed and the setting distances xc0 and yc0 (not shown in the drawings) by the reading data of the first face and the second face as the positional deviation information and determines that an image positional deviation is present if the differences exceeds a predetermined determination reference value (Step S211).

Next, the controller 72 generates positional deviation information concerning misalignment of the third reference image K2 and the fourth reference image M2 as shown in FIG. 7 as "d", and determines whether an image positional deviation is present. Specifically, the controller 72 calculates differences between the distance from the third reference image K2 to the fourth reference image M2 actually formed and the setting distances xd0 and yd0 from the reading data of the second face as the positional deviation information and determines that an image positional deviation is present if the differences exceeds a predetermined determination reference value (Step S212).

The controller 72 determines whether an image positional deviation is present at at least one of Steps S210 to S212 (Step S213). If the controller 72 determines that no image positional deviation is present at any of Steps S210 to S212 (Step S213; No), the controller 72 ends the image forming position correction processing.

If the controller 72 determines that an image positional deviation is present at at least one of Steps S210 to S212 (Step S213; Yes), the controller 72 feeds back, similarly to Steps 109 and S110, the positional deviation information to the image forming device 1 and/or the image forming device 2 corresponding to the positional deviation, and the controller 70 and/or the controller 71 correct the image forming conditions based on the positional deviation information fed back and correct the image forming position (Step S214, S215).

[Advantageous Effects of Invention]

The image forming system in this embodiment includes the first image forming device 1, the second image forming device 2 that is connected in series on the downstream side with respect to the first image forming device 1, and the image reading device 3 that is connected on the downstream side with respect to the first image forming device 1 and the second forming device 2, and further includes the first controlling means 70 causing the image former 12 of the first image forming device to form the first reference image K1 on the first face of a sheet, the second controlling means 71 causing the second image former 22 of the second image forming device 2 to form the second reference image M1 different from the first reference image K1 on the first face of the sheet on which the first reference image K1 is formed, and the determining means 72 determining whether an image positional deviation is present based on the first reference image K1 and the second reference image M1 that are formed on the first face of the sheet respectively by the first image former 12 of the first image forming device 1 and the second image former 22 of the second image forming device 2 and that are read by the image reading device 3.

With this configuration, when printing is performed on the same side of the sheet P by the first image forming device 1 and the second image forming device 2, it is possible to easily determine whether an image positional deviation is present.

In this embodiment, if the determining means 72 determines that an image positional deviation is present, the correcting means 70 and 71 correct the image positional deviation by changing an image forming position of at least one of an image to be formed by the first image forming device 1 and an image to be formed by the second image forming device 2.

With this configuration, the image forming system 10 can perform correction processing of the image forming position by itself.

The image forming system 10 further includes the generating means 72 that generates positional deviation information concerning the image positional deviation from an image forming position of the first reference image K1 and the second reference image M1, and the determining means 72 determines whether the image positional deviation is present based on the positional deviation information.

With this configuration, the image forming system 10 easily determines whether the positional deviation is present.

The image forming system 10 includes the communication units 60, 61, and 62 that send, if the determining means 72 determines that an image positional deviation is present, the positional deviation information to at least one of the first image forming device 1 and the second forming device 2.

With this configuration, the first image forming device 1 and the second image forming device 2 perform correction processing of the image forming position based on the positional deviation information.

The first reference image K1 and the second reference image M1 are different in image forming position or shape.

With this configuration, it is possible to easily determine whether the first reference image K1 and the second reference image M1 both formed on the first face of the sheet P. If a positional deviation is present, it is possible to easily obtain a positional deviation amount.

The first image forming device 1 and the second image forming device 2 of the image forming system perform double-sided printing. The first controlling means 70 causes the first image former 12 of the first image forming device 1 to form the third reference image K2 on the second face that is the opposite side of the first face of the sheet P on which the first reference image K1 is formed, and the second controlling means 71 causes the second image former 22 of the second image forming device 2 to form the fourth reference image M2 on the second face of the sheet P. The determining means 72 determines whether the image positional deviation is present as misalignment between the first reference image K1 and the third reference image K2, and determines whether the image positional deviation is present as misalignment between the second reference image M1 or the third reference image K2 and the fourth reference image M2.

With this configuration, when two image forming devices are connected in series and perform double-sided printing, it is possible to determine whether a positional deviation is present in each of the images formed on both sides of a sheet P.

Hereinbefore, the image forming system 10 according to the embodiment of the present invention is described, but the present invention is not limited to the described embodiment, and various modifications can be made within the scope of the invention.

For example, at Step S109, the controller 72 of the image reading device 3 feeds back the positional deviation information to the image forming device 1 and/or the image forming device 2 with the positional deviation information, but the present invention is not limited to this example. Alternatively, in the case where the forming position matches between the second reference image M1 and the first reference image K1 as reference, the positional deviation information may be fed back to the image forming device 2 only, and the forming conditions of the second reference image M1 only may be changed. This also applies to Step S214.

At Step S212, whether the forming position of the fourth image M2 deviates is determined by determining whether an image positional deviation is present between the third reference image K2 and the fourth reference image M2, but the present invention is not limited to this example. Alternatively, whether an image positional deviation is present in the fourth reference image is determined by determining whether an image positional deviation is present between the second reference image M1 and the fourth reference image M2.

At Steps S108 and S210 to S212, a distance between one reference image and another is measured regarding the second reference image M1, the third reference image K2, and the fourth reference image M2 to determine whether an image positional deviation is present by a difference between the distance and the setting distance. However, a distance between the edge of the sheet P and the second reference image M1, the third reference image K2, and the fourth reference image M2 actually formed may be measured and a difference between the measured distance and the setting distance is calculated as the positional deviation information to determine whether the image positional deviation is present based on the positional deviation information.

At this time, the controller 70 and the controller 71 may obtain the reading data from the controller 72, generate positional deviation information based on the reading data, and determine whether an image positional deviation is present based on the positional deviation information.

In the above-described embodiment, the first image forming device 2, the second image forming device 2, and the image reading device 3 respectively function as the first controlling means 70, the second controlling means 71, the determining means 72, but the present invention is not limited to this example. Alternatively, one of the devices may be an image processing apparatus with the first controlling means 70, the second controlling means 71, and the determining means 72. An image processing apparatus that functions as the first controlling means 70, the second controlling means 71, and the determining means 72 may be provided separately from the first image forming device 1, the second image forming device 2, and the image reading device 3.

What is claimed is:

1. An image forming system comprising:
a first image forming device,
a second image forming device that is connected in series on a downstream side with respect to the first image forming device; and
an image reading device that is connected on a downstream side with respect to the first image forming device and the second forming device,
wherein the first image forming device includes a first hardware processor,
wherein the second image forming device includes a second hardware processor,
wherein the image reading device includes a third hardware processor,
wherein the first hardware processor causes a first image former of the first image forming device to form a first reference image on a first face of a sheet;
wherein the second hardware processor causes a second image former of the second image forming device to form a second reference image different from the first reference image on the first face of the sheet on which the first reference image is formed;
wherein the third hardware processor determines whether an image positional deviation is present based on the first reference image and the second reference image that are formed on the first face of the sheet respectively by the first image former of the first image forming device and the second image former of the second image forming device and that are read by the image reading device.

2. The image forming system according to claim 1,
wherein, in response to determination by the third hardware processor that the image positional deviation is present, the first hardware processor and the second hardware processor correct the image positional deviation by changing an image forming position of at least one of an image to be formed by the first image former of the first image forming device and an image to be formed by the second image former of the second image forming device.

3. The image forming system according to claim 1,
wherein the third hardware processor generates positional deviation information concerning the image positional deviation from an image forming position of the first reference image and the second reference image,
wherein the third hardware processor determines whether the image positional deviation is present based on the positional deviation information.

4. The image forming system according to claim 3, further comprising:
a communication unit that sends, in response to determination by the third hardware processor that the image positional deviation is present, the positional deviation information to at least one of the first image forming device and the second forming device.

5. The image forming system according to claim 1,
wherein the third hardware processor determines whether the image positional deviation is present based on the first reference image formed by the first image former of the first image forming device.

6. The image forming system according to claim 1,
wherein the first reference image and the second reference image are different from each other in image forming position.

7. The image forming system according to claim 1,
wherein the first reference image and the second reference image are different from each other in shape.

8. The image forming system according to claim 6,
wherein the first reference image and the second reference image are different from each other in color.

9. The image forming system according to claim 1,
wherein the third hardware processor outputs, in response to detection of only one of the first reference image and the second reference image by the image reader, an alert via a notifier.

10. The image forming system according to claim 1,
wherein the first image forming device and the second image forming device perform double-sided printing,
wherein the first hardware processor causes the first image former of the first image forming device to form a third reference image on a second face that is an opposite side of the first face on which the first reference image is formed;
wherein the second hardware processor causes the second image former of the second image forming device to form a fourth reference image on the second face
wherein the third hardware processor determines whether the image positional deviation is present as misalignment between the first reference image and the third reference image, and determines whether the image positional deviation is present as misalignment between the second reference image or the third reference image and the fourth reference image.

11. An image processing apparatus comprising:
a first image forming device,
a second image forming device that is connected in series on a downstream side with respect to the first image forming device; and
an image reading device that is connected on a downstream side with respect to the first image forming device and the second forming device,
wherein the first image forming device includes a first hardware processor,
wherein the second image forming device includes a second hardware processor,
wherein the image reading device includes a third hardware processor,
wherein the first hardware processor causes a first image former of the first image forming device to form a first reference image on a first face of a sheet;
wherein the second hardware processor causes a second image former of the second image forming device to form a second reference image different from the first reference image on the first face of the sheet on which the first reference image is formed;
wherein the third hardware processor determines whether an image positional deviation is present based on the first reference image and the second reference image that are formed on the first face of the sheet respectively by the first image former of the first image forming device and the second image former of the second image forming device and that are read by the image reading device.

12. A non-transitory computer-readable storage medium storing a program for an image forming system,
wherein the image forming system comprises:
a first image forming device,
a second image forming device that is connected in series on a downstream side with respect to the first image forming device; and
an image reading device that is connected on a downstream side with respect to the first image forming device and the second forming device,
wherein the program causes a computer provided in the image forming system to:
cause a first image former of the first image forming device to form a first reference image on a first face of a sheet;
cause a second image former of the second image forming device to form a second reference image different from the first reference image on the first face of the sheet on which the first reference image is formed; and
determine whether an image positional deviation is present based on the first reference image and the second reference image that are formed on the first face of the sheet respectively by the first image former of the first image forming device and the second image former of the second image forming device and that are read by the image reading device.

* * * * *